(12) United States Patent
Weissmann et al.

(10) Patent No.: US 9,684,541 B2
(45) Date of Patent: Jun. 20, 2017

(54) METHOD AND APPARATUS FOR DETERMINING THREAD EXECUTION PARALLELISM

(71) Applicant: Intel Corporation, Santa Clara, CA (US)

(72) Inventors: Eliezer Weissmann, Haifa (IL); Arik Gihon, Rishon Le Zion (IL); Efraim Rotem, Haifa (IL); Paul S. Diefenbaugh, Portland, OR (US); Eric C. Samson, Folsom, CA (US); Michael Mishaeli, Zichron Yaakov (IL); Yoni Aizik, Haifa (IL); Chen Ranel, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 14/319,099

(22) Filed: Jun. 30, 2014

(65) Prior Publication Data

US 2015/0379668 A1    Dec. 31, 2015

(51) Int. Cl.
*G06T 15/00* (2011.01)
*G06F 9/50* (2006.01)
*G06F 3/14* (2006.01)

(52) U.S. Cl.
CPC ............. *G06F 9/5044* (2013.01); *G06F 3/14* (2013.01); *G09G 2360/08* (2013.01)

(58) Field of Classification Search
None
See application file for complete search history.

(56) References Cited

U.S. PATENT DOCUMENTS

| 2005/0013705 A1* | 1/2005 | Farkas | G06F 9/5088 417/393 |
| 2012/0146708 A1* | 6/2012 | Naffziger | G06F 1/206 327/512 |
| 2014/0143783 A1* | 5/2014 | Bose | G06F 1/324 718/102 |

* cited by examiner

*Primary Examiner* — Peter Hoang
(74) *Attorney, Agent, or Firm* — Nicholson De Vos Wenster & Elliott, LLP

(57) ABSTRACT

An apparatus and method for determining thread execution parallelism. For example, a processor in accordance with one embodiment comprises: a plurality of cores to execute a plurality of threads; a plurality of counters to collect data related to the execution of the plurality of threads on the plurality of cores; a dependency analysis module to analyze the data related to the execution of the threads and responsively determine a level of inter-thread dependency; and a control module to responsively adjust operation of the plurality of cores based on the determined level of inter-thread dependency.

21 Claims, 14 Drawing Sheets

METHOD AND APPARATUS FOR DETERMINING THREAD EXECUTION PARALLELISM

BACKGROUND

Field of the Invention

This invention relates generally to the field of computer processors. More particularly, the invention relates to an apparatus and method for determining thread execution parallelism.

Description of the Related Art

Application software that partitions its work across multiple cores (such as Intel® Architecture (IA®) cores) and the integrated graphics (GFX) hardware expects the operating system (OS) and the GFX driver to effectively schedule the compute resources for best performance and to optimally split the power and thermal budgets between all compute engines for the best energy efficiency.

However, limitations exist with respect to the effective scheduling of compute resources, such as: (1) the OS and the GFX driver have no way to share information to enable global optimization of performance and power; and (2) in current processors the hardware may force the compute engines to a temporary idle state, transparently to system software, making it harder for the OS and the GFX driver to monitor and control the activity of the compute engines.

BRIEF DESCRIPTION OF THE DRAWINGS

A better understanding of the preset invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
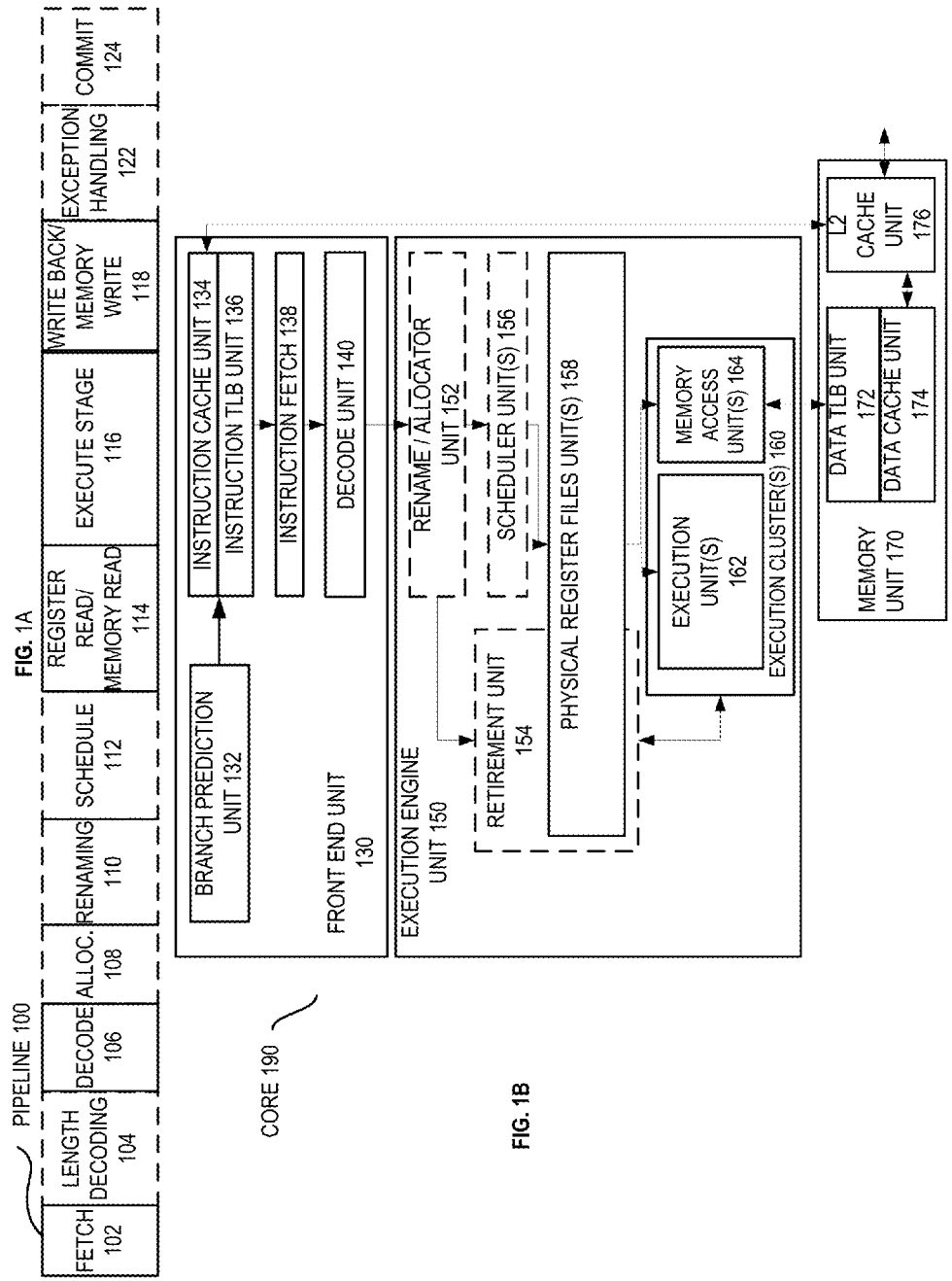
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
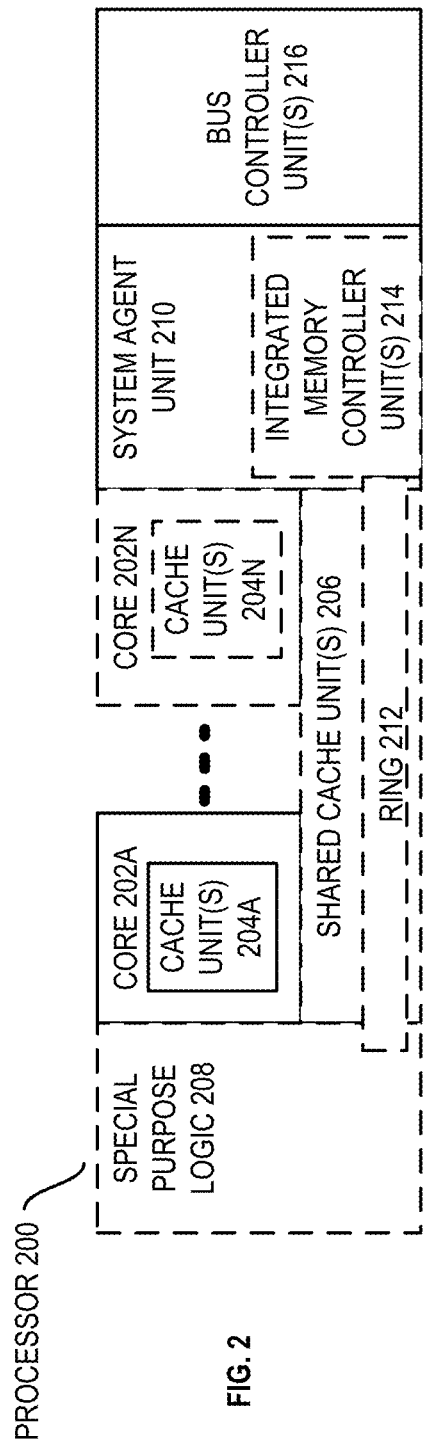
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
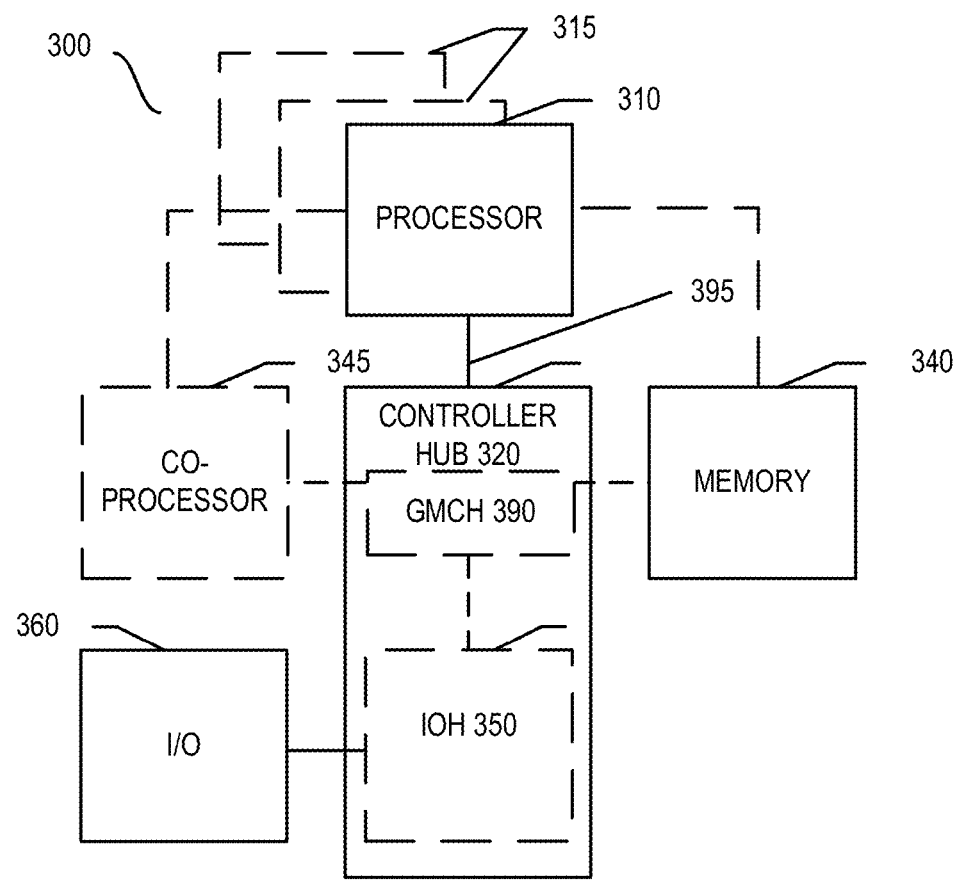
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
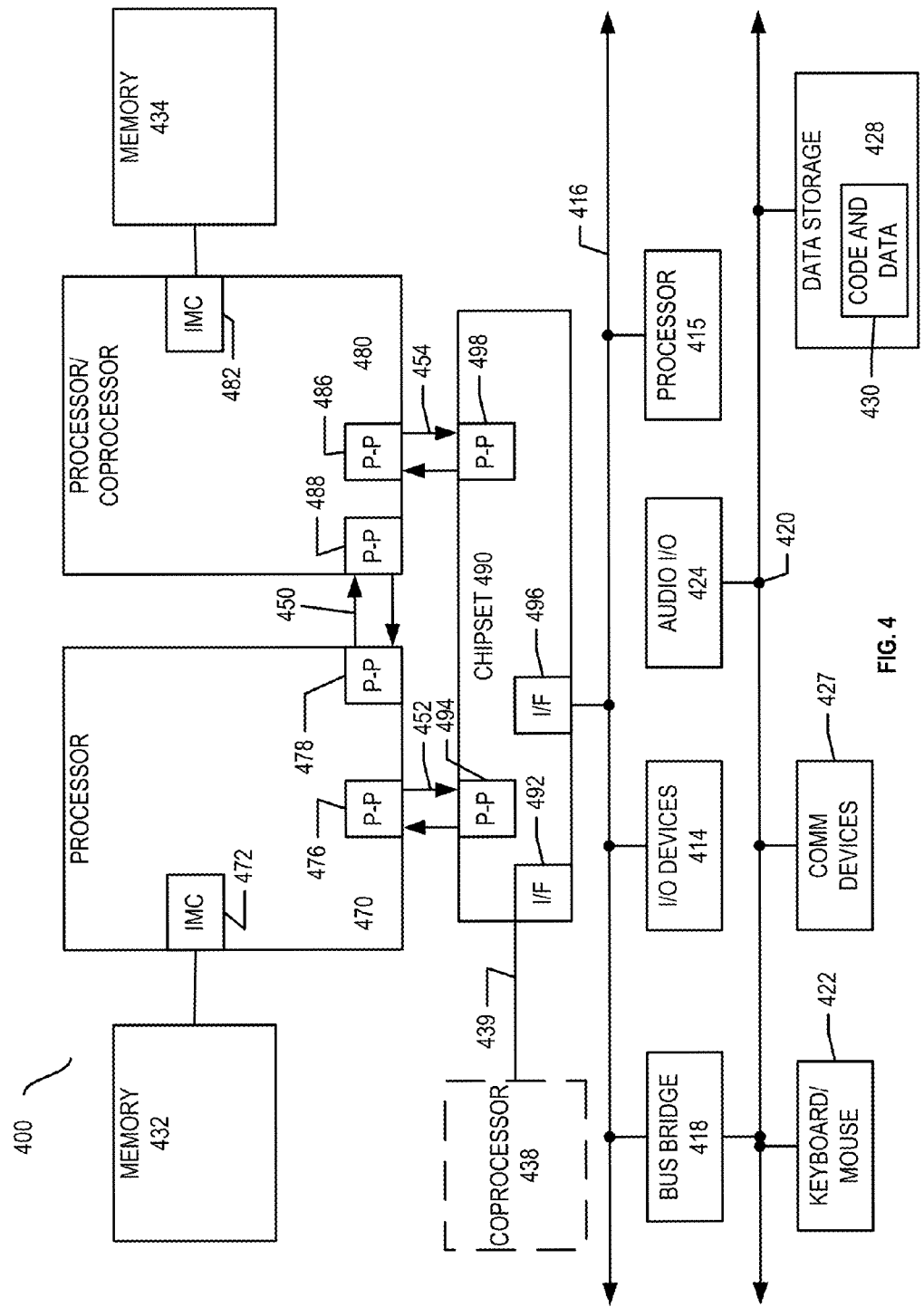
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
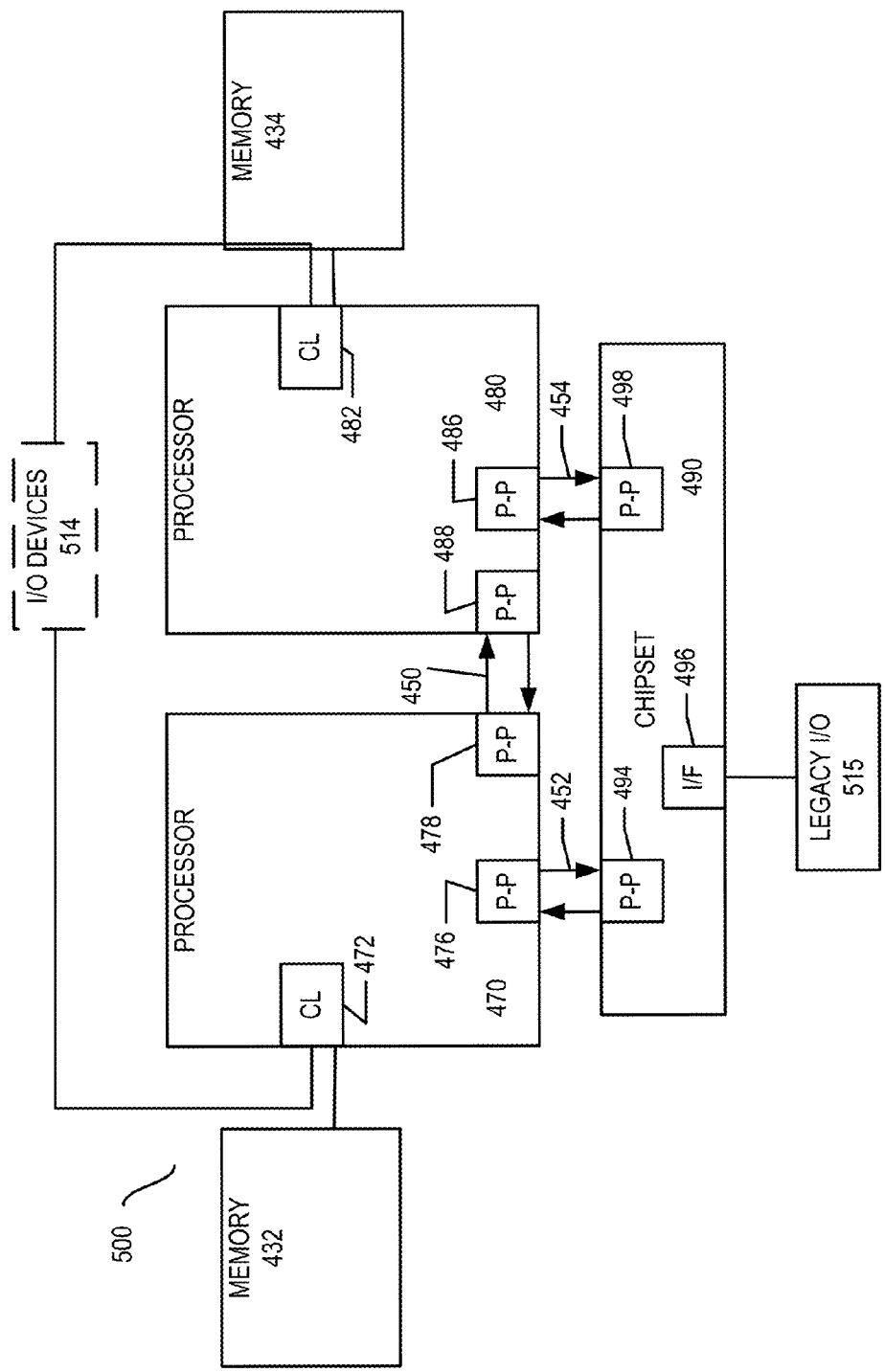
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
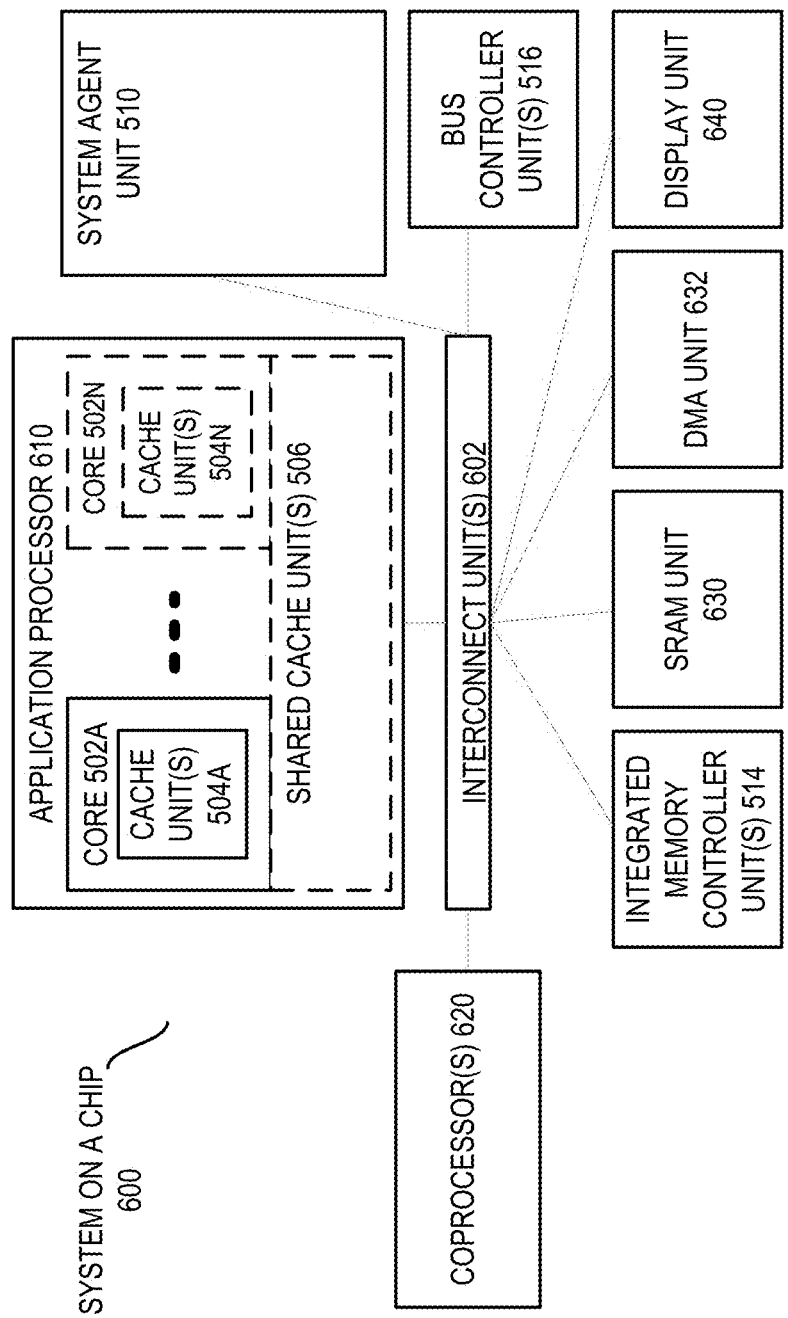
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
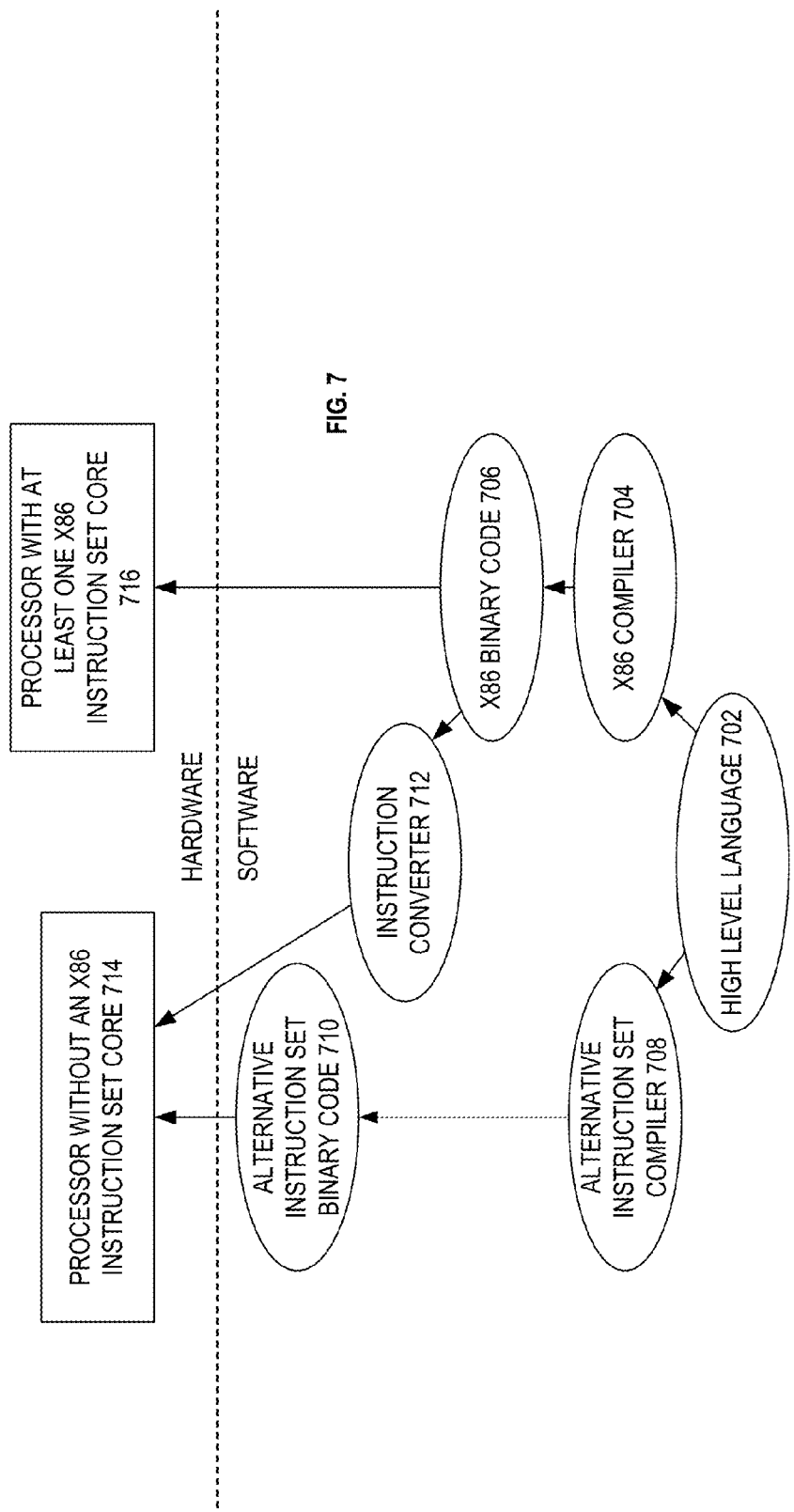
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Determining Thread Execution Parallelism

Allocating the optimal number of active cores minimizes the energy consumed when executing a specific workload. In order to dynamically control the number of active cores, one embodiment of the operating system (OS) scheduler monitors the level of parallelism and dependency between threads, and between the Integrated GFX unit and the cores. In one embodiment of the invention, the processor exposes a number of counters that allow the OS scheduler to track thread parallelism. A scheduler that continuously monitors those counters and controls the logical processors non-idle residency length and timing (e.g., the C0 Advanced Configuration and Power Interface (ACPI) state) can both optimize package idle time when maximum energy efficiency is required and optimize system performance.

Figure 8:
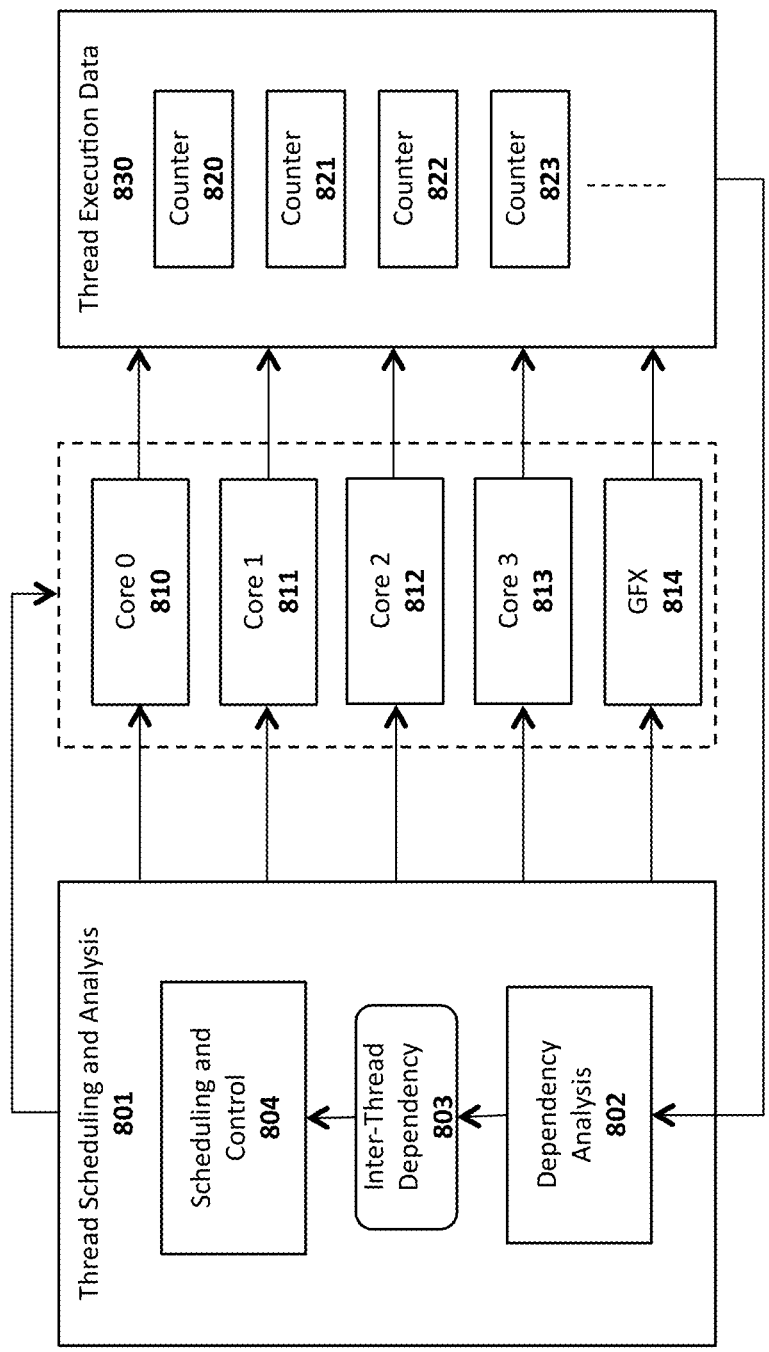
FIG. 8 illustrates one embodiment of an architecture for determining thread parallelism and responsively controlling a set of processing elements.

FIG. 8 illustrates one embodiment of the invention in which a thread analysis and control module 801 analyzes thread execution data 830 to estimate a level of inter-thread dependency 803 and responsively adjust the operation of a plurality of cores 810-813 and/or a graphics unit (GFX) 814. In one embodiment, the thread analysis and control module 801 is implemented as a module within an operating system (OS). However, the embodiments of the invention may be implemented in hardware (e.g., as dedicated logic within the processor or other circuit) or any combination of hardware and software.

In one embodiment, the thread execution data 830 is collected using a plurality of counters 820-823 which maintain counts related to the activity on each of the cores 810-813 and/or graphics unit 814 as threads are executed. For example, as discussed in detail below, one counter 820 may track the average number of physical active cores (e.g., adding the number of cores in state C0 every clock), another counter 821 may track the average time that any core was active, another counter 822 may track the average time the graphics unit 814 was active, and another counter 823 may track the average time that any one of the cores was active in parallel with the graphics unit. Additionally, in one embodiment, counters may be used to track the average time the graphics unit was active and the average time the cores and graphics unit are active concurrently. While these specific examples are provided for the purposes of illustration, the underlying principles of the invention are not limited to any specific set of thread execution data.

In one embodiment, dependency analysis logic 802 analyzes the thread execution data 830 to determine a level of inter-thread dependency 803. In one embodiment, the level of inter-thread dependency 803 indicates the extent to which threads being executed by the cores 801-813 and graphics unit 814 are capable of being executed in parallel. For example, in one embodiment, the dependency analysis logic 802 compares the average time of parallel execution on cores with the average of execution on any core. If the amount of parallel execution is much lower than the overall execution time, the dependency analysis logic 802 may assume that dependencies exist between the different threads executed on the cores. In contrast, if the amount of parallel execution time is close to that of any core, the dependency analysis logic 802 may assume high parallelism.

To the extent there is a high level of inter-thread dependency, then in one embodiment, scheduling and control logic 804 may speed up the execution of each core 810-813 to complete the whole job as soon as possible while energy consumption is relatively low (since only one core is executing most of the time). For example, it may increase the core frequency to complete execution as quickly as possible. In contrast, to the extent there is a low level of inter-thread dependency, then the scheduling and control logic 804 may reduce the core frequency since performance is obtained by parallel processing. Thus, for example, energy can be saved by the lower frequency and by inserting forced idle periods in between execution periods. In one embodiment, the scheduler of the scheduling and control logic 804 is the operating system and/or virtual machine monitor (VMM) scheduler and may also be implemented in firmware.

Figure 9:
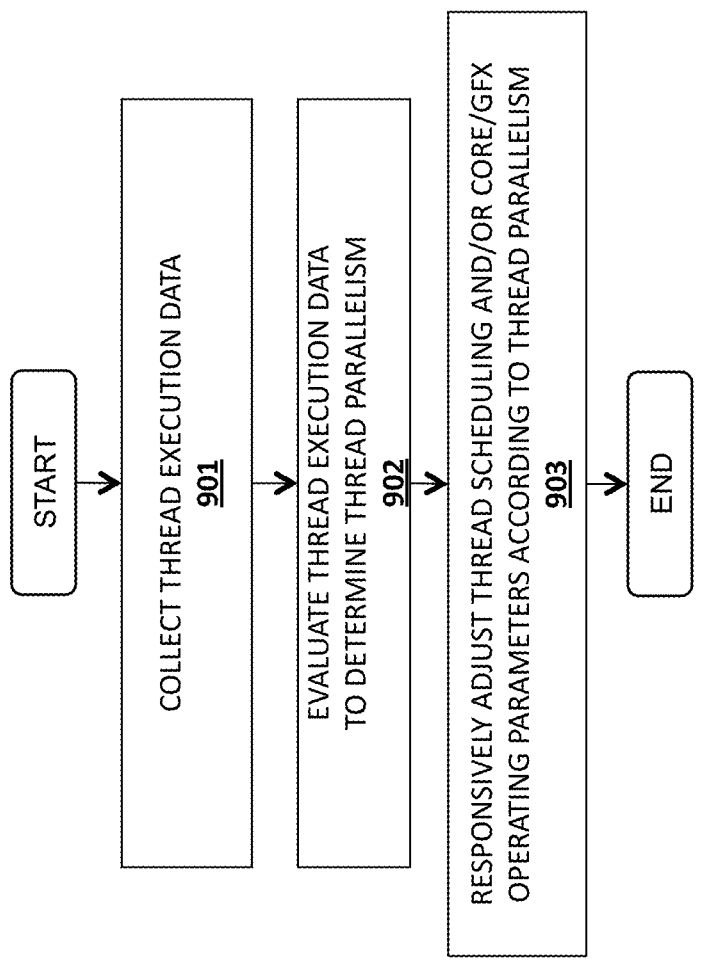
FIG. 9 illustrates a method in accordance with one embodiment of the invention.

One embodiment of a method is illustrated in FIG. 9. The method may be implemented within the context of the architecture shown in FIG. 8, but is not limited to any particular architecture.

At 901, thread execution data is collected. As mentioned, in one embodiment, this is accomplished using execution counters which monitor variables related to inter-thread dependency such as the average number of physical active cores, the average time that any core was active, the average time the graphics unit was active, and the average time that any one of the cores was active in parallel with the graphics unit.

At 902, the thread execution data is evaluated to determine a level of thread parallelism and/or a level of inter-thread dependency (i.e., with relatively greater inter-thread dependency resulting in relatively less parallelism). For example, as mentioned above, this may involve determining the extent to which threads are concurrently executing in parallel across the cores and/or graphics unit.

At 903, thread scheduling and/or core/graphics unit operating parameters are adjusted based on the detected level of thread parallelism. For example, as mentioned, the frequency of the cores and graphics unit may be adjusted and/or forced idle states may be intentionally inserted to conserve power.

The counters 820-823 may be maintained in Model-Specific Registers (MSRs), memory mapped I/O (MMIO) registers, platform environment control interface (PECI) registers, or any registers visible to software such as the operating system and graphics unit drivers. For example, in FIG. 8, the thread analysis and control logic 801 may be implemented as a module within the operating system and may be provided with access to the MSRs containing the thread execution data 830.

Figure 10:
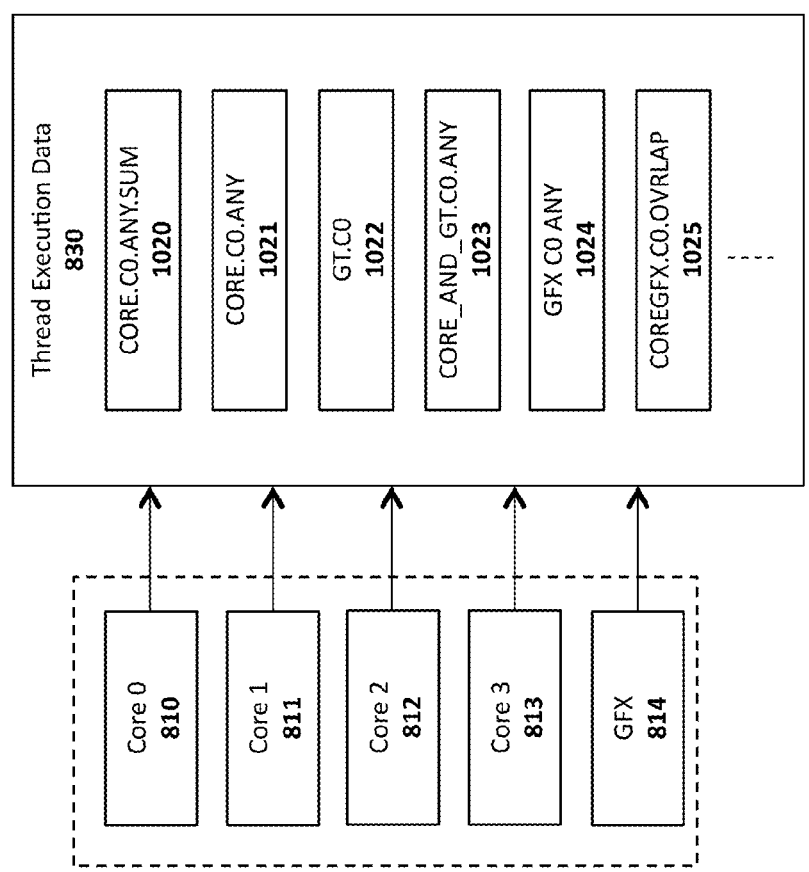
FIG. 10 illustrates a set of counters used to determine thread parallelism in one embodiment of the invention.

As illustrated in FIG. 10, in one embodiment, the following counters are exposed:

CORE.C0.ANY.SUM 1020: A counter that expresses the average number of physical active cores. In one embodiment, this counter adds the number cores in C0 every clock. For example, the counter value may be incremented as a function of the number of cores that reside in the active state during a specified time period (e.g., if N cores are simultaneously in C0).

CORE.C0.ANY 1021: A counter that expresses the average time that any physical core was active. In one embodiment, this counter increments (by 1) whenever one or more IA cores are active and in active state GT.C0 1022: A counter that expresses the average time the Integrated graphics unit was active. In one embodiment, this counter increments whenever the integrated graphics unit (GT) slices or unslice are active and in the active state.

CORE_AND_GT.C0.ANY 1023: A counter that expresses the average time that any one of the physical cores was active in parallel with the integrated graphics unit. In one embodiment, this counter increments whenever GT slices or unslice are active and in active state and in overlap with at least one of the IA cores that is active and in active state.

In one embodiment, with CORE.C0.ANY the dependency analysis logic 802 receives the average time where at least one core was active. With CORE.C0.ANY.SUM the dependency analysis logic 802 is provided with the average number of physical cores that were active during that time.

The following calculations are then performed in one embodiment. The average number of active cores across package active & idle phases is determined using $\Delta$CORE.C0.ANY.SUM/$\Delta$TSC. In addition, the average number of active cores when the package is active is determined using $\Delta$CORE.C0.ANY.SUM/$\Delta$CORE.C0.ANY. Here, $\Delta$TSC represents the number of cycles executed in the measured time window under the reference (nominal) frequency ratio. The assumption used herein is that the base rate of all of these counters is also the TSC clock rate.

Using this data, the dependency analysis logic 802 may estimate the inter-thread dependency 803. For example, the dependency analysis logic 802 may compare the average time of parallel cores execution with the average of any core execution. If the amount of parallel execution is significantly lower than the overall execution time, the dependency analysis logic 802 may calculate some level of dependency between the different cores. If the amount of parallel execution time is close to that of any core, then the dependency analysis logic 802 may assume high parallelism.

As mentioned above, if there is significant dependency, the scheduling and control logic 801 may then speed up execution of each core to complete the whole job as soon as possible (while energy consumption is relatively low since most of the time only one core is executing). If there is significant parallelism, the scheduling and control logic 801 can reduce execution frequency since performance is obtained by parallel processing and energy can be saved by lower frequency and/or by the processor inserting forced idle periods.

In the first three examples below the thread analysis and control logic 801, by using those counters 1020-1025, can learn about the level of alignment between the active cores and graphics units.

Figure 11:
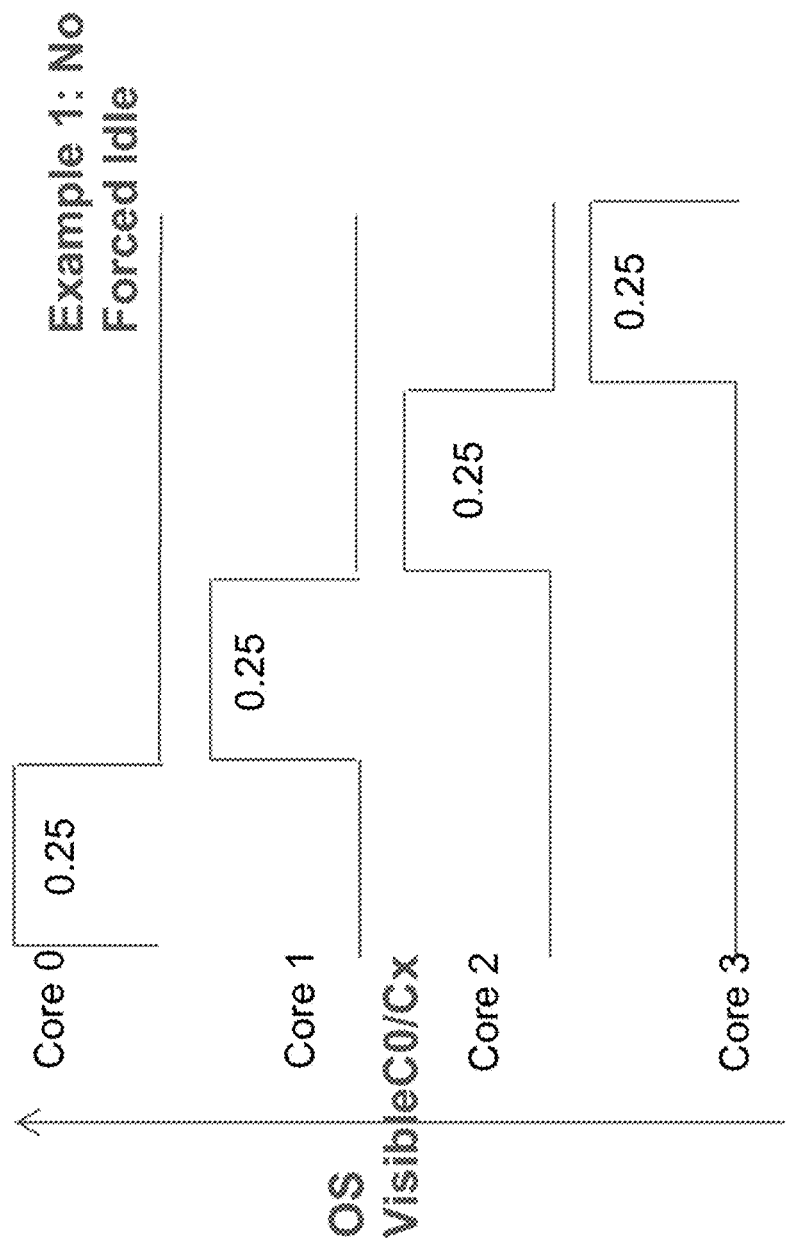
FIGS. 11-14 illustrates specific examples of the operation of one embodiment of the invention.

By way of example, and not limitation, FIG. 11 illustrates an example with four cores 0-3 each of which is active for ¼ (0.25) of a specified time period (e.g., 1 cycle). The average number of active cores is $\Delta$CORE.C0.ANY.SUM/$\Delta$TSC=1/1=1. The average number of any active core is 1. The average number of simultaneously active cores when in package C0 is $\Delta$CORE.C0.ANY.SUM/$\Delta$CORE.C0.ANY=1/1=1 which means no parallel code. Thus, in this example, the code is completely serialized, possibly due to complete inter-thread dependency.

Figure 12:
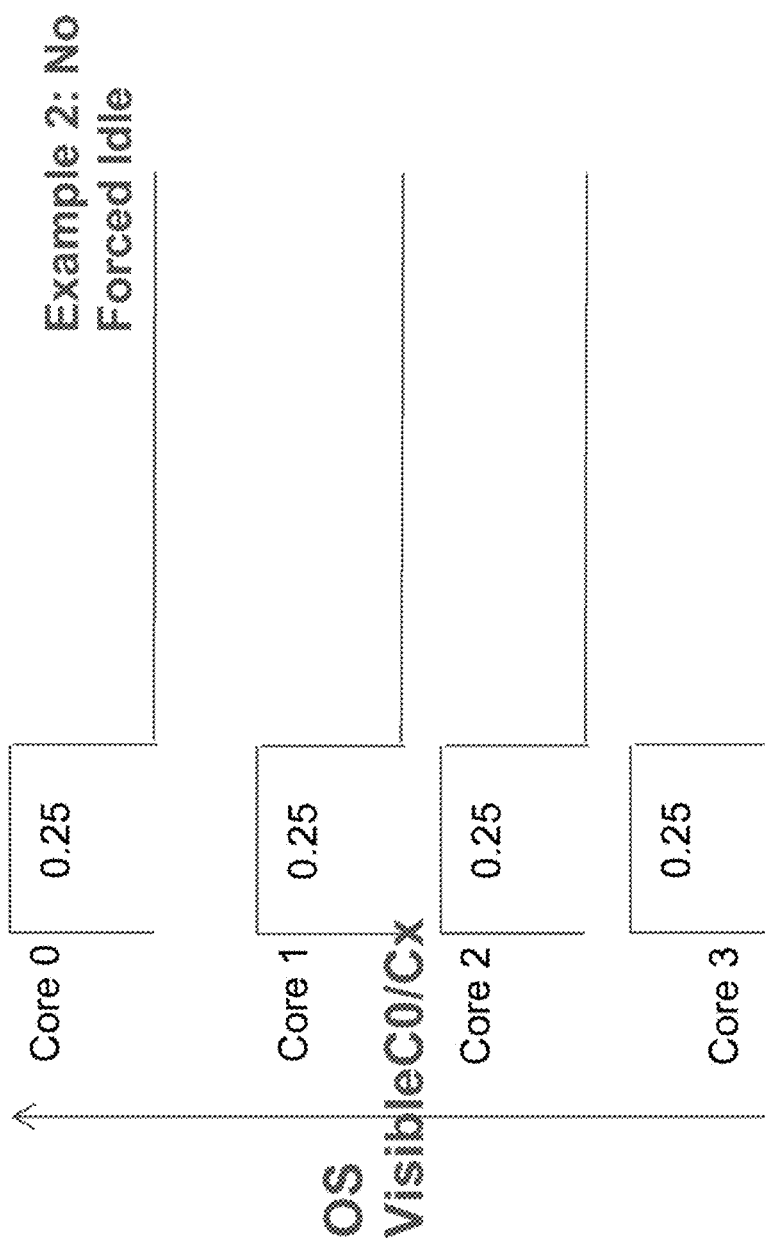

In contrast, in FIG. 12, the average number of active cores is $\Delta$CORE.C0.ANY.SUM/$\Delta$TSC=1/1=1. The average number of any active core is 0.25. The average number of simultaneously active cores when in C0 is $\Delta$CORE.C0.ANY.SUM/$\Delta$IA.C0.ANY=1/0.25=4 which means fully parallel code.

Figure 13:
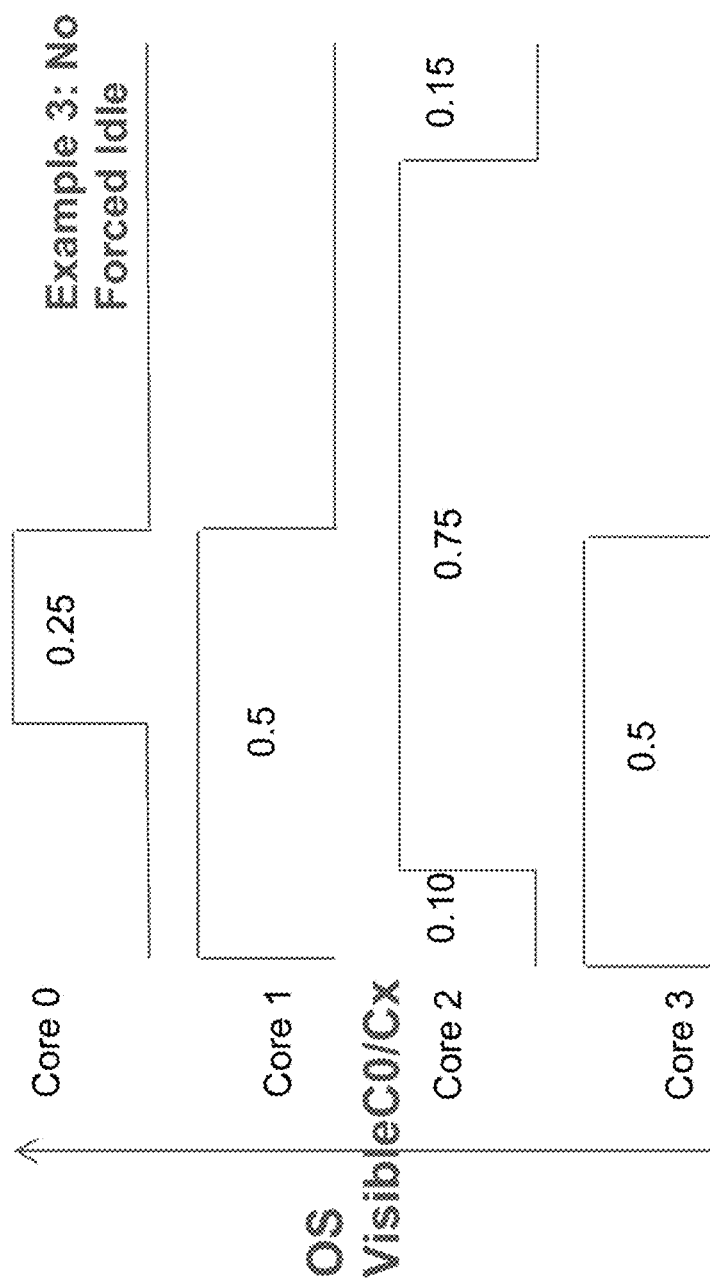

In FIG. 13, the average number of active cores is: $\Delta$IA.C0.ANY.SUM/$\Delta$TSC=(0.25+0.5+0.75+0.5)/1=2. The average number of any active core is 0.85. The average number of simultaneously active cores when the package is in the C0 state is $\Delta$CORE.C0.ANY.SUM/$\Delta$CORE.C0.ANY=2/0.85=2.35, which means the code is partially serial and partially parallel. Thus, the code possibly includes some inter-thread dependency.

Figure 14:
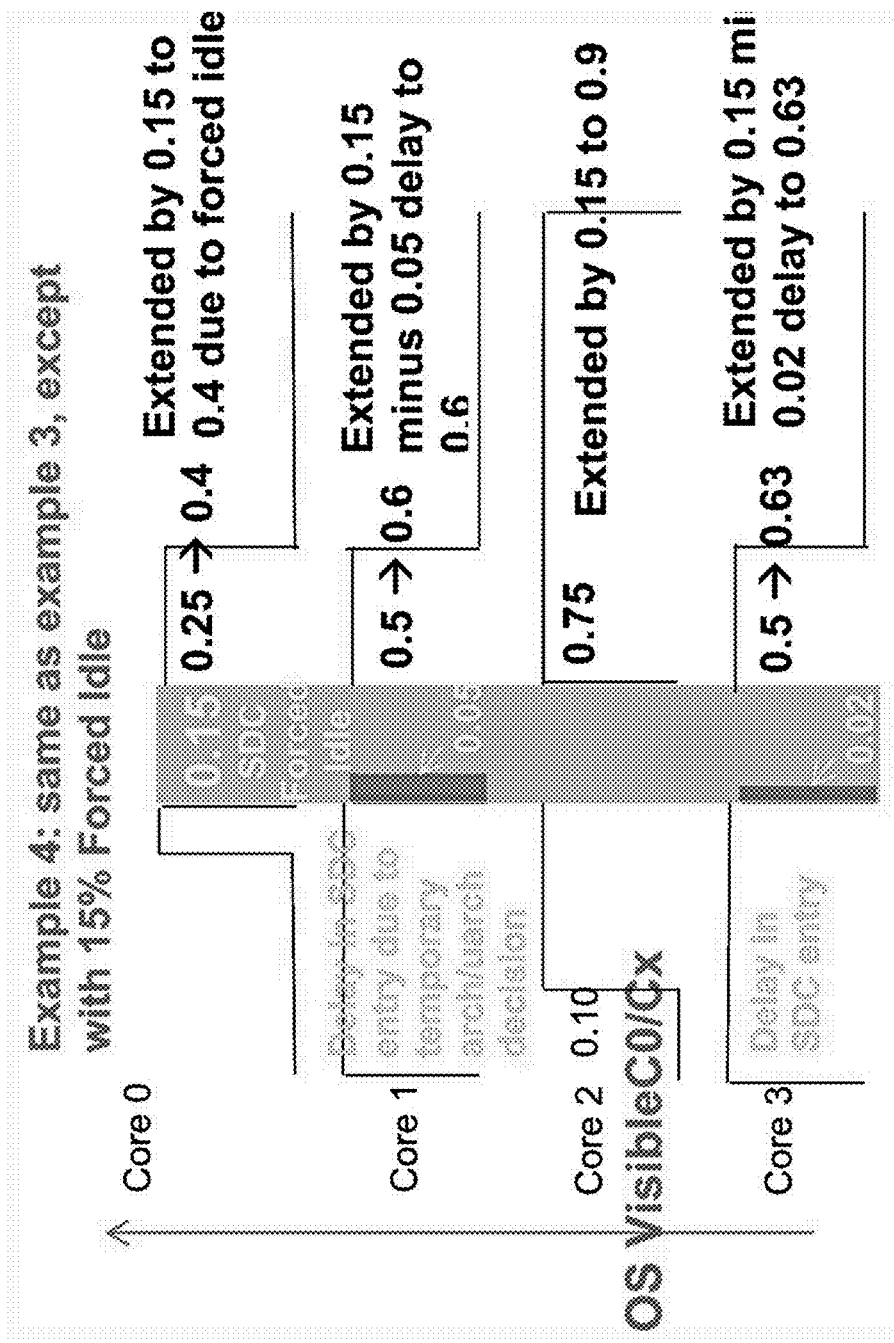

Since the physical cores can be forced to idle state by the hardware transparently to the OS (or, more specifically, the thread analysis and control logic 801 within the OS), the new counters 1020-1025 enable the OS to measure execution time while excluding the forced idle time from the actual OS visible C0 time. The example illustrated in FIG. 14 demonstrates the ability of the OS to determine the average usage of cores even during forced idle activities (e.g., in an embodiment in which forced idle is supported in hardware). Here, the true number of simultaneously active cores is the same as in FIG. 13: 2.18. As discussed above, the new counters/MSRs may provide this information. The OS-visible C0 residency may be determined as follows. The average number of active cores is 2.53 (0.4+0.6+0.9+0.63). That is, for core 0, the 0.25 value is increased by 0.15 to arrive at a value of 0.4 due to forced idle; for core 1, the 0.5 value is increased by 0.15 due to forced idle and decreased by 0.05 due to a temporary pipeline processing (e.g., architecture/uarch) decision to arrive at a value of 0.6; for core 2, the 0.75 value is increased by 0.15 due to forced idle to arrive at 0.9; and for core 3, the value of 0.5 is increased by 0.15 due to forced idle and decreased by 0.02 due to a temporary pipeline processing delay to arrive at 0.63.

The average number of any active core is 1 because 100% of the time at least 1 core is in the C0 state. The average number of simultaneously active cores when in package C0 is 2.53/1=2.53. Because this value is greater than 2.18, this means that the OS gets the impression of higher parallelism.

In one embodiment of the invention two additional counters are used (as illustrated in FIG. 10):

(1) GFX.C0.ANY 1024 which, in one usage model, expresses the average time the integrated graphics engine 814 is active; and (2) COREGFX.C0.OVRLAP 1025 which, in one usage model, expresses the average time the cores 810-813 and the graphics engine 814 are active together.

Using the above counters, one embodiment of the invention determines the time that at least one core was active while the graphics engine (GFX) was idle or only the graphics engine was active using the following respective equations:

$$PKG\_CORE\_ANY\_ONLY=CORE.C0.ANY-COREGFX.C0.OVRLAP$$

$$PKG\_GFX\_ANY\_ONLY=GFX.C0.ANY-COREGFX.C0.OVRLAP$$

Using similar techniques, one embodiment estimates the level of dependency or parallel work between core and the Integrated GFX engine using the following:

1. If COREGFX.C0.OVRLAP~=0 and CORE.C0.ANY>>0 and GFX.C0.ANY>>0, the OS may assume that the cores' work and the integrated GFX device work is serialized. Therefore, there is likely a high dependency between the cores and integrated GFX device execution time. In this case, the OS may balance the resources (e.g., the engine frequencies) in a way that optimizes the execution time for both of the compute domains.

2. If COREGFX.C0.OVRLAP~=CORE.C0.ANY, the OS may assume that there is low serializing dependency between the cores and the integrated GFX device, which means the cores' work is nicely aligned to the GFX device work.

3. If COREGFX.C0.OVRLAP~=GFX.C0.ANY, the OS may assume that there is low serializing dependency between the cores and the Integrated GFX device which means the integrate GFX device work is aligned with the cores' work.

In #2 and #3 above, OS may allocate the resources to the components with highest priority.

4. If CORE.C0.ANY~=PKG_CORE_ANY_ONLY, this means that most of the cores' execution time is spent when the integrated GFX device is idle. Resource allocation does not have to split between the cores and the GFX. If the GFX engine is completely idle, all resources will be directed to the cores.

5. If GFX.C0.ANY~=PKG_GFX_ANY_ONLY, this means that most of the integrate GFX device execution time is spent while the cores are idle. Resource allocation does not have to split between cores and the GFX device. If the cores are completely idle, all resources will be directed to the Integrated GFX engine.

The counters 1020-1025 provide the true active/idle picture since they do not count forced idle time as active time, while software believes it's actually active. Thus, the use of counters as described herein allow the OS low overhead visibility into what is actually happening in the system, both in the cores and in the integrated GFX device.

Note that while the embodiments of the invention above focus on the internal/integrated GFX engine, the same underlying principles may be applied with external graphics engines, other forms of accelerators, and/or other devices such as PCI Express (PCIE) devices.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a plurality of cores to execute a plurality of threads;
an integrated graphics unit;

a plurality of counters to collect data related to the execution of the plurality of threads on the plurality of cores, wherein the plurality of counters comprises a first counter to express an average number of physical active cores, a second counter to express an average time that any physical core was active, a third counter to express an average time that the integrated graphics unit was active, and a fourth counter to express an average time that any one of the physical cores was active in parallel with the integrated graphics unit;

dependency analysis logic circuit to analyze the data related to the execution of the threads and responsively determine a level of inter-thread dependency; and control logic circuit to responsively adjust operation of the plurality of cores based on the determined level of inter-thread dependency.

2. The processor as in claim 1 wherein the control logic circuit is to dynamically allocate a particular number of active cores to minimize energy consumed when executing the threads.

3. The processor as in claim 1 wherein the control logic circuit is to dynamically allocate a particular number of active cores to maximize performance when executing the threads.

4. The processor as in claim 1 wherein for relatively higher levels of inter-thread dependency, the control logic circuit is to increase execution frequency on each core to speed up execution of the threads.

5. The processor as in claim 4 wherein for relatively lower levels of inter-thread dependency, the control logic circuit is to reduce the execution frequency on each core and/or inserting forced idle periods on the cores.

6. The processor as in claim 1 wherein the dependency analysis logic circuit determines an average number of active cores across active and idle phases by dividing a change in value of the first counter by a number of cycles executed in a measured time window.

7. The processor as in claim 1 wherein the dependency analysis logic circuit determines an average number of active cores when the processor is active by dividing a change in value of the first counter by a change in value of the second counter.

8. A method comprising:

executing a plurality of threads on a plurality of cores;

collecting data related to the execution of the plurality of threads on the plurality of cores using a plurality of counters, wherein the plurality of counters comprises a first counter to express an average number of physical active cores, a second counter to express an average time that any physical core was active, a third counter to express an average time that an integrated graphics unit was active, and a fourth counter to express an average time that any one of the physical cores was active in parallel with the integrated graphics unit;

analyzing the data related to the execution of the threads and responsively determining a level of inter-thread dependency; and responsively adjusting operation of the plurality of cores based on the determined level of inter-thread dependency.

9. The method as in claim 8 wherein responsively adjusting operation of the plurality of cores comprises dynamically allocating a particular number of active cores to minimize energy consumed when executing the threads.

10. The method as in claim 8 wherein responsively adjusting operation of the plurality of cores comprises dynamically allocating a particular number of active cores to maximize performance when executing the threads.

11. The method as in claim 8 wherein for relatively higher levels of inter-thread dependency, execution frequency is adjusted on each core to speed up execution of the threads.

12. The method as in claim 11 wherein for relatively lower levels of inter-thread dependency, the execution frequency on each core is reduced and/or forced idle periods inserted on the cores.

13. The method as in claim 8 wherein analyzing the data related to the execution of the threads and responsively determining a level of inter-thread dependency comprises determining an average number of active cores across active and idle phases by dividing a change in value of the first counter by a number of cycles executed in a measured time window.

14. The method as in claim 8 wherein analyzing the data related to the execution of the threads and responsively determining a level of inter-thread dependency comprises determining an average number of active cores when in an active phase by dividing a change in value of the first counter by a change in value of the second counter.

15. A non-transitory machine-readable medium having program code stored thereon which, when executed by a machine, causes the machine to perform the operations of:

executing a plurality of threads on a plurality of cores;

reading data from a plurality of counters, the data related to the execution of the plurality of threads on the plurality of cores, wherein the plurality of counters comprises a first counter to express an average number of physical active cores, a second counter to express an average time that any physical core was active, a third counter to express an average time that an integrated graphics unit was active, and a fourth counter to express an average time that any one of the physical cores was active in parallel with the integrated graphics unit;

analyzing the data related to the execution of the threads and responsively determining a level of inter-thread dependency; and responsively adjusting operation of the plurality of cores based on the determined level of inter-thread dependency.

16. The machine-readable medium as in claim 15 wherein responsively adjusting operation of the plurality of cores comprises dynamically allocating a particular number of active cores to minimize energy consumed when executing the threads.

17. The machine-readable medium as in claim 15 wherein responsively adjusting operation of the plurality of cores comprises dynamically allocating a particular number of active cores to maximize performance when executing the threads.

18. The machine-readable medium as in claim 15 wherein for relatively higher levels of inter-thread dependency, execution frequency is adjusted on each core to speed up execution of the threads.

19. The machine-readable medium as in claim 18 wherein for relatively lower levels of inter-thread dependency, the execution frequency on each core is reduced and/or forced idle periods inserted on the cores.

20. The machine-readable medium as in claim 15 wherein analyzing the data related to the execution of the threads and responsively determining a level of inter-thread dependency comprises determining an average number of active cores across active and idle phases by dividing a change in value of the first counter by a number of cycles executed in a measured time window.

21. The machine-readable medium as in claim 15 wherein analyzing the data related to the execution of the threads and responsively determining a level of inter-thread dependency comprises determining an average number of active cores when in an active phase by dividing a change in value of the first counter by a change in value of the second counter.

* * * * *